Oct. 2, 1923.
M. P. SODERBERG
CUTTER OR MIXER
Filed April 1, 1922
1,469,691
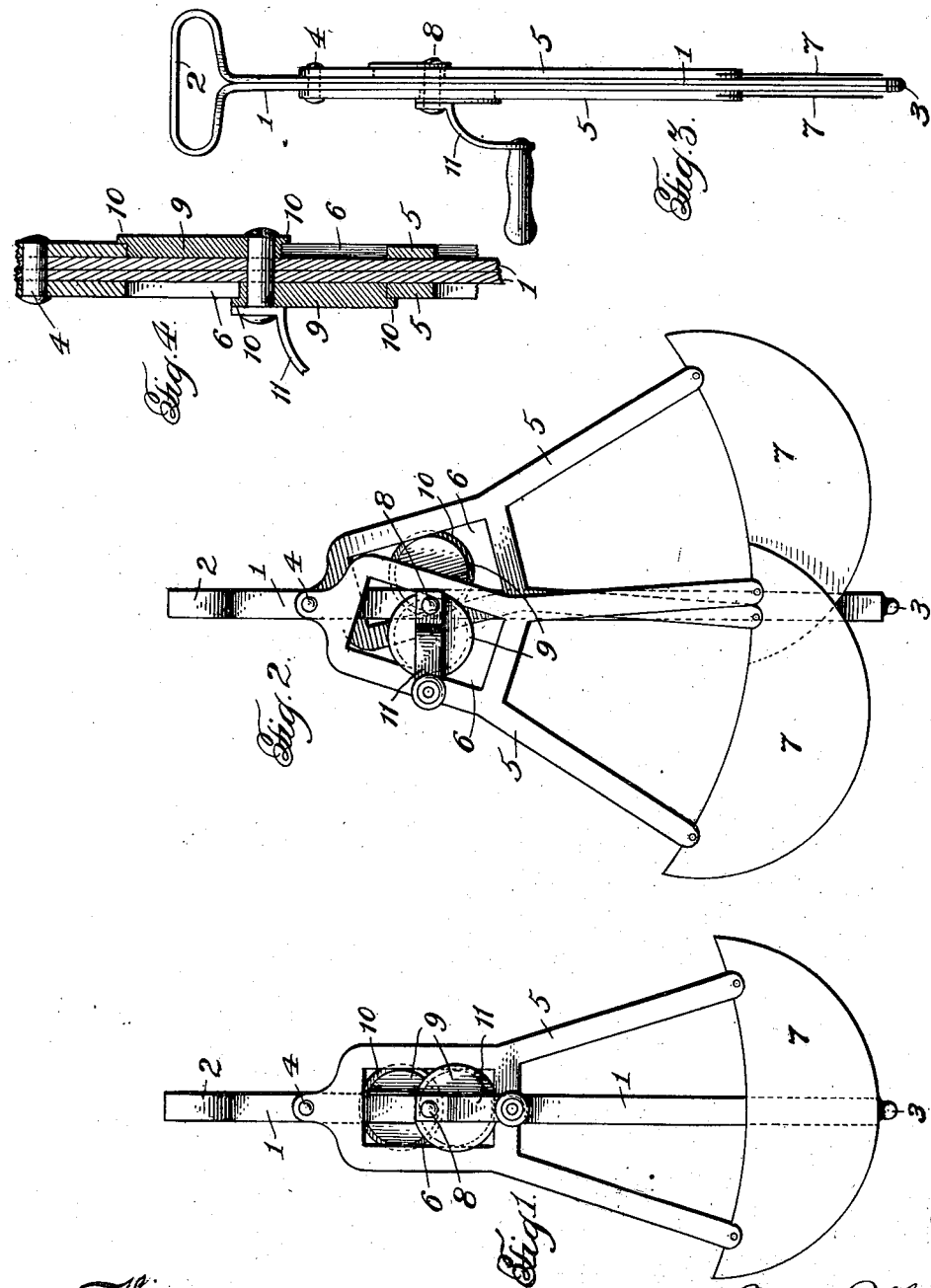

Patented Oct. 2, 1923.

1,469,691

UNITED STATES PATENT OFFICE.

MARY P. SODERBERG, OF PORTLAND, OREGON.

CUTTER OR MIXER.

Application filed April 1, 1922. Serial No. 548,613.

*To all whom it may concern:*

Be it known that I, MARY P. SODERBERG, a citizen of the United States, residing at Portland, in the county of Multnomah and State of Oregon, have invented certain new and useful Improvements in Cutters or Mixers, of which the following is a specification, reference being had therein to the accompanying drawing.

My invention relates to new and useful improvements in a cutter or mixer and more particularly to such a device for cutting and mixing the flour and shortening used in making pie pastry.

The principal object of the invention resides in the provision of such a device which will thoroughly cut and mix the material to make a flaky pastry, the cutting admitting air to the pastry thereby making it flaky and light.

Another object consists in the construction of the device in such a manner that it is light and simple of operation, being preferably of such size as to particularly adapt it to household use although it will be understood that by increasing the size it might be adapted for use in bakeries or similar places where pastry is made in large quantities.

With the above and other objects in view, which will appear as the description proceeds, my invention consists in the novel details of construction and arrangement of parts, described in the following specification and illustrated in the accompanying drawings, and while I have illustrated and described the preferred embodiments of the invention as they now appear to me it will be understood that such changes may be made as will fall within the scope of the appended claims:

In the drawings:

Fig. 1 is a side elevation with the cutting blades lying parallel in their initial positions.

Fig. 2 is a side elevation with the cutting blades swung in their cutting operation.

Fig. 3 is an end view, and

Fig. 4 is a fragmental vertical section showing in detail the operating eccentrics with relation to the cutter frames.

In the drawings 1 indicates a support or standard which is preferably formed of a relatively narrow strip of metal folded upon itself, curved at the upper end to form a handle 2, and reduced at the lower end as shown at 3. Pivotally connected to the support or standard by means of the pivot pin 4 are the swinging frames 5 adapted to operate on opposite sides of the support. The frames are provided adjacent the tops with the elongated opening 6 and secured to the lower ends of each of the frames is a hardened steel plate or blade 7 which preferably have the curved lower edges as shown. The lower edges of the blades will terminate a short distance from the lower end of the support or standard so that the blades may be swung free of the bowl or other receptacle in which the device is being used.

Rotatably mounted in the support or standard 1, below the pivot pin 4, is a shaft 8 which has secured thereto the eccentrics 9 which are adapted to operate in the elongated opening 6 of the frames 5. These eccentrics are provided with flanges 10 which overlie the side edges of the openings 6 and engage the outer faces of the frames to prevent said frames from swinging out from the support. As will be noted in the drawings, the eccentrics 9 extend in opposite directions so that when rotating the shaft the frames and cutter or mixer blades will be swung in opposite directions. A crank handle 11 is connected to one end of the shaft for rotating the same.

In practice the flour and shortening to make up the pastry mixture is placed in a bowl or other suitable receptacle and then my cutter or mixer is placed in the receptacle with the reduced end 3 of the support engaging the bottom thereof. Some mixing bowls are formed with a little depression in the center of the bottom and when such bowls are in use the reduced end 3 will be engaged in the depression. With the cutter or mixer in position the handle 2 is grasped by one hand and the crank handle 11 with the other hand and the shaft 8, with its eccentrics 9, rotated. The rotation of the eccentrics in the openings 6 of the frames 5 cause the frames to be swung from side to side thereby carrying the blades or plates 7 through the flour and shortening and thoroughly mixing the same. As the blades swing they not only mix the flour and shortening but cut therethrough to admit air thereby making the pastry mixture flaky and light. The flanges 10 on the eccentrics prevent the frames from swinging away from the support. Previously it has been the practice to use two table knives for cutting and mixing pie pastry mixtures and I have found that by using my improved form of cutter and mixer that considerable time and labor is saved. As stated in the objects of my invention the device is primarily adapted for household use but by increasing the same it may be used by bakeries or others making such mixtures in large quantities.

Having fully described my invention what I claim as new and desire to secure by Letters Patent is:

1. A device of the character described comprising a support, frames pivoted to opposite sides of the support, each having an opening therein, a blade secured to each frame, a shaft rotatably mounted in the support, oppositely disposed eccentrics secured to the shaft and operating in the openings in the frame to impart swinging movement thereto in opposite directions, and flanges on the eccentrics to engage the outer faces of the frames.

2. A device of the character described comprising a support, frames pivoted to opposite sides of the support, each having an opening therein, a blade secured to each frame, a shaft rotatably mounted in the support, oppositely disposed eccentrics secured to the shaft and operating in the openings in the frame to impart swinging movement thereto in opposite directions, and means on the eccentrics and engageable with the frames for preventing movement of the frames away from the support.

3. A device of the character described comprising a support formed of a relatively narrow strip of material bent to form vertically extending parallel portions, the upper ends of which are curved to form a handle and the lower ends of which are reduced, a frame pivotally connected to the support, means for imparting swinging movement to the frame, and a cutting blade secured to the frame, the lower edge of the blade terminating above the lower reduced end of the support.

4. A device of the character described comprising a support formed of a relatively narrow strip of material bent to form vertically extending parallel portions, the upper ends of which are curved to form a handle and the lower ends of which are reduced, frames pivoted to opposite sides of the support and each having an elongated opening therein, a blade secured to each frame, the lower edges of said blades terminating above the lower reduced end of the support, a shaft rotatably mounted in the support, oppositely disposed eccentrics secured to the shaft and operating in the openings in the frames to impart swinging movement thereto in opposite directions, and flanges on the eccentrics to engage the outer faces of the frames to prevent movement of the frames away from the support.

In testimony whereof I hereunto affix my signature in the presence of two witnesses.

MARY P. SODERBERG.

Witnesses:
  GERTRUDE H. PHILLIPS,
  E. Z. DE KEATER.